J. G. HALLAS & W. N. WEEDEN.
Wick-Raisers.
No. 143,143. Patented September 23, 1873
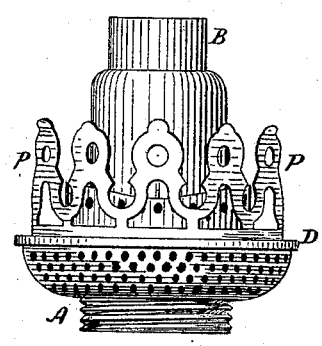
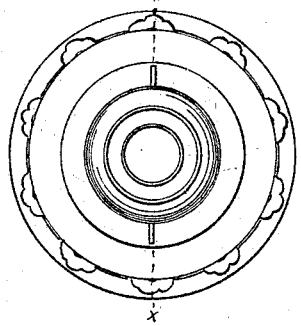
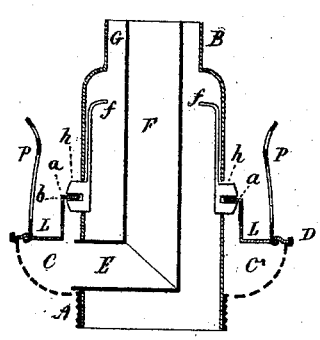
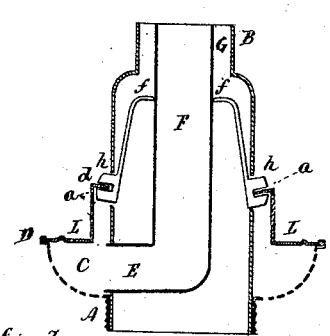
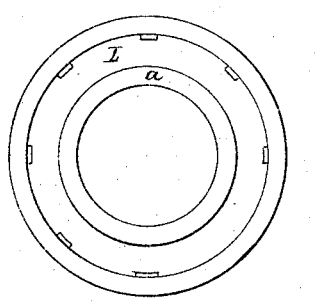
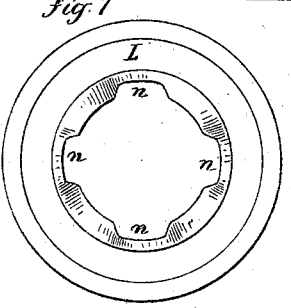
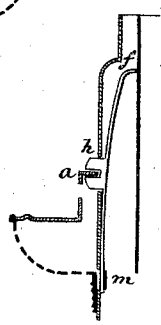

UNITED STATES PATENT OFFICE

JAMES G. HALLAS AND WILLIAM N. WEEDEN, OF WATERBURY, CONNECTICUT, ASSIGNORS TO THE BENEDICT & BURNHAM MANUFACTURING COMPANY, OF SAME PLACE.

IMPROVEMENT IN WICK-RAISERS.

Specification forming part of Letters Patent No. 143,143, dated September 23, 1873; application filed August 28, 1873.

*To all whom it may concern:*

Be it known that we, JAMES G. HALLAS and WILLIAM N. WEEDEN, of Waterbury, in the county of New Haven and State of Connecticut, have invented a new Improvement in Lamp-Burners; and we do hereby declare the following, when taken in connection with the accompanying drawings and the letters of reference marked thereon, to be a full, clear, and exact description of the same, and which said drawings constitute part of this specification, and represent, in—

Figure 1, a side view; Fig. 2, a top view; Fig. 3, a vertical central section on line $x\ x$; Fig. 4, the same section with the wick-adjuster partially turned; Fig. 5, a top view of the adjusting ring or cam; Fig. 6, a side view of the same; and in Figs. 7 and 8, a modification of the adjusting device.

This invention relates to an improvement in that class of burners for lamps which employ a tubular wick; the primary object of the invention being a convenient and ready adjustment of the wick, and the invention consists in the arrangement of a flange around the wick-tube, in connection with the wick-adjusters, the said flange constructed with a successive rise and fall, and having a rotary movement around the said tube. The wick-adjusters will be raised and lowered by the said successive rise and fall in the said flange.

A is the base or neck of the burner, fitted to be screwed into the lamp in the usual manner of other burners. Attached to or made a part of this neck is a tube, B, the upper end of the tube corresponding to the external diameter of the wick. At the neck, and around this tube, the air-chamber C is formed by a perforated casing extending up and connected to the chimney-rest at D, as seen in Figs. 1, 3, and 4, and as more fully hereinafter described. From this chamber C a tube, E, leads to the internal tube F, the said tube F extending up to the top, or nearly so, of the tube B, and concentric therewith, leaving a space, G, between the two tubes for the wick. This tube F serves as a conductor from the air-chamber, to lead the external air from the said chamber to the flame, to facilitate combustion.

The wick usually employed in this class of burners is made flat, and of a width to form a perfect tube at the upper end of the burner. The tubular form of the wick is preserved as the wick is raised, gradually drawing into tubular form from the bottom toward the top. The wick is passed up through the tube B, around the tube F, presenting the wick at the upper end of the space between the two tubes.

The chimney-rest is formed by a circular plate, L, shown detached in Fig. 5. This plate surrounds the outer tube, and its edge is inclosed, or united to the edge of the perforated air-distributer, so as to be turned fully around the tube. To this are fitted vertical springs P, more or less in number, by means of which the chimney is held in place, and which also form a convenient means for turning the chimney-rest L. Between the chimney and tube, and at a little distance from the latter, the chimney-rest rises vertically, or nearly so, and then is turned in toward the tube. The upper edge or flange $a$ is of cam shape, as seen in Fig. 5, so that this flange $a$, around the tube, is higher at the points $d$ than at the others, $b$ $b'$, as seen in Fig. 6. $f$ are the wick-raisers, one of which is shown in perspective in Fig. 4ª. The upper end is turned inward, and is constructed with points or other means to enable it to engage the wick. Extending down, the lower end is fitted with an arm, $h$, and this arm is grooved, so as to sit onto the flange $a$. The arms $h$ pass through a slot in the tube, and are retained in their proper relative position, but may be otherwise held or supported, it only being essential that the arms $h$ shall engage the flange $a$; therefore, by turning the chimney-rest, the flange $a$ moves around the tube, and its different elevation causes the adjusters $f$ to rise and fall, according to the height of the flange $a$.

With the flange at right angles, as seen in Fig. 3, the adjusters would move up and down without engaging the wick. It is, therefore, essential that the adjusters be thrown in, as seen in Fig. 4, when the wick is to be raised or lowered. We therefore make the flange $a$—say, as from $b$ to $d$, Fig. 6—at right angles; then from $d$ to $b'$ the flange is turned downward, as in Fig. 4; consequently, from the point $d$ to $b'$ the adjusters will be forced down upon the wick, as in Fig. 4. Turning the chimney-rest in one direction, therefore, so that the adjusters pass down from $d$ to $b'$, the wick will be drawn down; then, passing on up again, as from $b$ to $d$, the adjusters will rise free from the wick, and down again from $d$ to $b'$, drawing the wick with it. Reversing the operation—that is, turning the chimney-rest in the opposite direction—the adjusters will rise from $b'$ to $d$, in connection with the wick, and raising the wick; then down from $d$ to $b$ for a second rise, and so on.

The vertical portion of the chimney-rest is perforated, and open into the chimney C, to allow the requisite quantity of air to pass up within the chimney, and between that and the wick-tube.

The chimney-rest may be formed with a flange, $a$, without the inclination to throw forward the adjusters, by forming the edge of the flange with a recess, $n$, between the rise and fall, as seen in Fig. 7; and arrange the adjuster $f$ as seen in Fig. 8, in connection with the tube—say, as at $m$—below the flange $a$, the adjuster being held at the point $m$, so as to allow of its being moved freely up and down, but yet so firmly held that the adjuster will spring back and forth—that is, when the arm $h$ comes to the recess $n$, the adjuster will fall back from the wick, and, as the recess passes off from the arm, the adjuster will be forced forward, as seen in Fig. 8. We, however, prefer that portions of the flange $a$ be inclined, as first described.

By this construction the chimney-rest may be turned around and around until the wick has attained the desired elevation.

While we prefer to make the flange $a$ a part of the chimney-rest, it may be independent of that, and turned by other means. We therefore do not wish to be understood as confining ourselves to the particular method described for operating the cam-shaped flange $a$ to actuate the adjusters.

We claim as our invention—

1. The flange $a$, having a rotary movement around the wick-tube, and in connection with the wick-adjusters, substantially in the manner described, the said flange $a$ constructed in a cam shape, so that in rotation it will impart an up-and-down in-and-out movement to the adjusters, substantially as set forth.

2. In combination with the adjusters $f$ and the chimney-rest, the flange $a$, constructed as described, so that by turning the said chimney-rest the requisite rotary motion for the adjustment of the wick is imparted to the said flange $a$.

JAMES G. HALLAS.
WM. N. WEEDEN.

Witnesses:
    FRED. A. MASON,
    GEO. G. BLAKESLEE.